US 6,647,208 B1
Nov. 11, 2003

(12) United States Patent
Kirby

(54) HYBRID ELECTRONIC/OPTICAL SWITCH SYSTEM

(75) Inventor: Alan J. Kirby, Hollis, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/376,504

(22) Filed: Aug. 18, 1999

Related U.S. Application Data

(60) Provisional application No. 60/125,024, filed on Mar. 18, 1999.

(51) Int. Cl.[7] ............................................. H04J 14/00

(52) U.S. Cl. ............................ 398/45; 398/58; 398/79

(58) Field of Search .................................. 359/110, 117, 359/124, 128, 139, 326; 385/16, 17; 398/9, 43, 45, 46, 58, 79, 82

(56) References Cited

U.S. PATENT DOCUMENTS

| 4,873,681 | A | 10/1989 | Arthurs et al. ............. 359/123 |
|-----------|---|---------|-------------------------------------|
| 5,077,727 | A | 12/1991 | Suzuki ....................... 359/123 |
| 5,327,423 | A | 7/1994 | Audouin et al. ............ 370/489 |
| 5,351,146 | A | 9/1994 | Chan et al. ................. 359/118 |
| 5,438,445 | A | 8/1995 | Nakano ....................... 359/124 |
| 5,479,287 | A | 12/1995 | Johansen et al. ............ 359/128 |
| 5,485,297 | A | 1/1996 | Sotom ........................ 359/123 |
| 5,500,860 | A | 3/1996 | Perlman et al. ............. 370/401 |
| 5,504,609 | A | 4/1996 | Alexander et al. .......... 359/125 |
| 5,541,756 | A | 7/1996 | Chang-Hasnain et al. .. 359/123 |
| 5,559,625 | A | 9/1996 | Smith et al. ................ 359/125 |
| 5,712,932 | A | 1/1998 | Alexander et al. ............ 385/24 |
| 5,712,942 | A | 1/1998 | Jennings et al. ............. 385/134 |
| 5,726,783 | A | 3/1998 | Cooper et al. .............. 359/125 |
| 5,774,244 | A | 6/1998 | Tandon et al. .............. 359/125 |
| 5,796,740 | A | 8/1998 | Perlman et al. ............. 370/401 |
| 5,801,861 | A | 9/1998 | Majima ....................... 359/124 |
| 5,847,852 | A | 12/1998 | Domon et al. .............. 359/118 |
| 5,862,138 | A | 1/1999 | Liu ............................. 370/406 |
| 5,892,924 | A | 4/1999 | Lyon et al. ............. 370/405 X |
| 6,333,799 | B1 * | 12/2001 | Bala et al. .................. 359/128 |

FOREIGN PATENT DOCUMENTS

EP    0 614 291 A1    9/1994

OTHER PUBLICATIONS

Bannister, J., et al., "How Many Wavelengths Do We Really Need In An Internet Optical Backbone?," Nov. 1998.
Bannister, J., et al., "How Many Wavelengths Do We Really Need? A Study of Packets Over Wavelengths," http:\\www.comsoc.org\tcgn\conference\gbn98\bannister-slides.pdf, presented Nov. 16, 1998.

(List continued on next page.)

Primary Examiner—Thomas Mullen
(74) Attorney, Agent, or Firm—Hamilton, Brook, Smith & Reynolds, P.C.

(57) ABSTRACT

A high speed optical communication and data transfer network comprises fiber optic links interconnecting a plurality of hybrid electronic-optical switch devices, each hybrid switch circuit including an electronic switch, electronic switch controller and optical switch. The hybrid switch circuits and nodes on the periphery of the core network communicate amongst each other over a first dedicated wavelength. Optical signals on the first dedicated wavelength are converted to electronic signals which are monitored by the electronic controller in each hybrid switch circuit. Routing in the network is optimized by transmitting lower volume data traffic on the first dedicated wavelength which is typically slower due to optical/electronic signal conversions and which uses more resources. Higher capacity data transfers are achieved by transmitting data on an assigned carrier wavelength over an established flow path among the optical switches of multiple hybrid switch circuits. Based on high and low volume data traffic, the method and apparatus discussed herein advantageously supports direct and indirect optical data transmissions with as few overall intermediate optical-to-electrical or electrical-to-optical conversions as possible.

42 Claims, 7 Drawing Sheets

OTHER PUBLICATIONS

"WDM Technology Meets IP Switching," http:\www.comsoc.org\tcgn\conference\gbn99\bannister-presentation.pdf, Mar. 1998.

Alexander, S. B., et al., "A Precompetitive Consortium on Wide–Band All–Optical Networks," *J. of Lightwave Technology*, pp. 714–735 (May–Jun., 1993).

Kaminow, I. P., et al., "A Wideband All–Optical WDM Network," *IEEE Jour. on Selected Areas in Communications*, pp. 780–799 (Jun. 1996).

Nishio, M., and Suzuki, S., "WD&MMT Switching Networks in Combination with Photonic and Electronic Switching Technique," *IEEE*, pp. 0590–0596 (1991).

Lentine, A. L., et al., "Optoelectronic ATM Switch Employing Hybrid Silicon CMOS/GaAs FET–SEEDs," *SPIE*, pp. 101–108 (Feb. 1996).

Parry, G., et al., "Optical Switching Networks for Communication Systems," Dept. of Electronic & Electrical Engineering, Univ. College London, pp. 189–206.

Chan, V.W.S., et al., "Architectures and Technologies for High–Speed Optical Data Networks," *J. of Lightwave Technology*, pp. 2146–2168 (Dec. 1998).

Mei, Y., and Qiao, C., "Efficient Distributed Control Protocols for WDM All–Optical Networks," Abstract, Dept. of ECE, SUNY at Buffalo, pp. 1–4.

Dubinsky, Y., and Segall, A., "A Flexible Rerouting Protocol in ATM Networks," *IEEE*, pp. 1488–1496 (Jun. 1999).

Ayanoglu, E., "Reduction of Restoration Capacity Requirements in Advanced Optical Networks," GlobeCom '95, IEEE Global Telecommunications Conf., Singapore, pp. 1018–1022 (Nov. 14–Nov. 16, 1995).

Widjaja, I., et al., "Scalability Evaluation of Multi–Protocol Over ATM (MPOA)," *IEEE*, pp. 1505–1512 (Jun. 1999).

Castanon, G. A., and Tonguz, O. K., "Combined Teletraffic/Transmission Performance of Optical Cross–Connected Networks Using Hybrid–Store–and Forward," Globecom 97, IEEE Telecommunications Conf., pp. 856–862 (Aug. 1997).

* cited by examiner

HYBRID ELECTRONIC/OPTICAL SWITCH SYSTEM

RELATED APPLICATION

This application claims the benefit of a prior U.S. Provisional Application Ser. No. 60/125,024 filed Mar. 18, 1999 entitled "Hybrid Electronic/Optical Switch System," the entire teachings of which are incorporated herein by reference.

GOVERNMENT SUPPORT

This invention was made with government support under Contract Number F19628-95-C-0002 awarded by the Air Force. The Government has certain rights in the invention.

BACKGROUND OF THE INVENTION

The volume of data traffic between entities is increasing at such an alarming rate that methods and associated hardware supporting data communication will require fundamental changes in the near to moderate future. In particular, the existing network infrastructures supporting present day communications, including fiber optic cables, electronic switches and associated methods of implementation, must be redesigned to support new world demands.

A common solution for the present communication bottleneck is to employ higher speed hardware. However, even the advanced speed of electronic switches can not necessarily provide enough support for the increased demand. While higher speed processing hardware offers some promise for increased bandwidth, it addresses only part of the problem. Ultimately, data transfers are limited by the throughput of the slowest link in the system.

High speed routing and increased data transfer rates of information is the key to higher speed communication. Based on certain techniques used today, network communication typically involves labeling data packets at multiple levels to facilitate the flow of data between a source and destination node. Routing in these systems, therefore, requires a tremendous amount of electronic processing power because a packet of information generally must pass through and be processed by many routers before it arrives at the appropriate destination. Unfortunately, each router hop involves processing header information of each data packet to be routed in the network system, causing considerable delays in the transmission of data.

It has been suggested that optical networks provide the greatest promise for increasing communication bandwidth because there are many benefits to directing communication data via an optical channel. Based on such methods, data can be directed or multiplexed without having to unravel and process flowing data at each router or multiplexor. This greatly reduces the amount of electronic data processing, which is typically the cause of severe bottlenecks. Additionally, and perhaps almost as important, the flow of data on an optical channel is the fastest way to transmit data since the channel bandwidth is so great. However, suggested systems are typically sub-optimal due to inherent inefficiencies.

SUMMARY OF THE INVENTION

The present invention provides a method and apparatus for increasing the bandwidth of data communication by optimizing the use of resources among nodes on a core data communication network. Aspects of an existing data communication infrastructure such as a fiber optic network can be combined with inventive hardware and methods to achieve this end.

For high capacity switching, the present invention reduces the analysis of data required in packet switching and effectively establishes circuit switching through high capacity optical switches. To that end, communication with upstream and downstream circuits, generally other switch circuits, establishes flow paths for transmitting data through the optical switches.

In particular, the present invention advantageously allows for the optimization of optical data transmissions with as few intermediate opto-electrical conversions as possible. When justified, direct high speed routing of optical data signals is achieved by switching optical signals through the core network based on assigned wavelengths and established flow paths without converting the optical signals to electronic signals at an intermediate node. An alternative embodiment includes circuitry to convert an optical signal to an electrical signal, which is thereafter directed and retransmitted as an optical signal to a destination node. Slower speed traffic is routed more conventionally from a source to a destination where WDM optical signals typically undergo a series of electro-optical/opto-electrical conversions for routing at intermediate nodes before arriving at a desired destination.

Based on the core network topology, hybrid switch circuits communicate amongst each other and peripheral nodes over at least a first dedicated wavelength to establish a flow path and assign a wavelength to be used for routing optical data signals. Each hybrid switch circuit includes an optical switch for switching optical signals based on the assigned wavelength to an optical fiber in the established flow path. Additionally, each hybrid switch circuit includes an electronic controller for monitoring traffic on the first dedicated wavelength and controlling the associated optical switch. Once a flow path is established, data is transferred on an assigned wavelength between peripheral nodes on the core network. This method and apparatus supporting the transmission of optical data is advantageous because it provides, at a reduced cost, a method of directly routing densely packed optical data signals from a source to a destination without electronic switch converter delays. In the preferred embodiment, a flow path is based on the MPLS protocol. However, ATM routing of data is also possible in an alternative embodiment.

Each hybrid switch circuit includes an electronic controller and supporting circuitry that converts optical data signals at the first dedicated wavelength to electronic signals. This data is then processed and monitored to determine whether a flow path should be established for routing WDM optical signals. Alternatively, data flows may be explicitly requested by data management systems that monitor traffic flow through the fibers. For example, a particular link may be reserved for heavy traffic expected at a certain time of the day. Further, personnel monitoring data traffic through the network optionally create policies or rules for establishing optimal traffic flows.

Messages and data destined for other hybrid switch circuits or peripheral switches are passed on to other hybrid switch circuits through interconnecting fibers over the first dedicated wavelength. Communication among elements in the core network includes a process of learning a topology of elements in the core network and associated interconnections.

In the preferred embodiment, peripheral nodes on the core network aggregate and convert data to WDM optical signals for transmission over fibers to the hybrid switch circuits in the core network, where the peripheral node includes an electronic switch that responds to communication from the core network to forward data over the established flow paths. A peripheral node aggregating data traffic bound for other nodes on the core network transmits a message to a hybrid switch circuit in the core network when there exists a need to establish a flow path for optical routing of data to a destination node. Alternatively, the electronic controller in the hybrid switch circuits monitors data traffic and generates a message to establish a high speed flow path. In one embodiment, transmitted optical data signals on a dedicated wavelength include destination tags which are monitored to determine whether an flow path should be created for high speed, direct optical data transfers.

Communication transmitted on the first dedicated wavelength is optionally transmitted on a number of dedicated wavelengths. Further, communication among elements in the core network is optionally transmitted over an electrical link interconnecting network elements.

The optical switch in a hybrid switch circuit includes a network of optical multiplexors and de-multiplexors controlled by electrical signals generated by the electronic controller. Therein, the electrical signals provide setup information for routing an optical signal at a given wavelength. Low volume data traffic between nodes on the periphery of the core network is typically transferred over the first dedicated wavelength through the core network. High volume data traffic, on the other hand, is transferred over established flow paths using assigned wavelengths when it is optimal to do so, such as when a bottleneck occurs on the first dedicated wavelength. A strategic balance is constantly maintained in the core network between direct flow paths and communications over the first dedicated wavelength such that the use of communication resources in the core network are optimized.

In the preferred embodiment, routing intelligence for establishing flow paths is distributed throughout the hybrid switch circuits in the core network. Alternatively, routing intelligence for establishing flow paths is performed, at least in part, at a central routing intelligence location.

Each hybrid switch circuit includes an optical splitter disposed in selectable routing paths to support the simultaneous flow of an optical data signal to more than one destination. Additionally, each hybrid switch circuit supports a combination of flow types within the core network itself. For example, data transferred on an established flow path in the core network is optionally converted at a switch in the core network that further transmits the data over the first dedicated wavelength. Likewise, data transferred over the first dedicated wavelength among hybrid switch circuits in the core network is optionally converted in a hybrid switch circuit in the core network that further transmits the data over an established higher speed flow path. When transmitting data over multiple or changing flow paths, data transmitted over the core network is marked for coordinating a flow of related data over multiple established flow paths.

It is anticipated that data transmission failures in the core network will occur due to failed elements. These failures are detected by monitoring received data and transmitting test packets to verify optical paths. When such a failure is detected, for example, future data transfers are re-mapped to properly functioning optical routes within the core network. In the preferred embodiment, data transmission failures on existing paths resume on a pre-computed alternate flow path, providing a quick recovery from the failure.

The present invention has many advantages over the prior art. For instance, it provides a method and apparatus to support not only lower speed data transfers using electronic switches, but also higher speed data transfers using optical routers through the cooperation of elements in a core network. Based on the flexible method and apparatus discussed herein, naturally aggregated traffic at regional networks is dynamically routed at a reduced cost with higher efficiency.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Wavelength division multiplexing techniques can be enhanced by direct and indirect optical routing as discussed in the present application.

Figure 1:
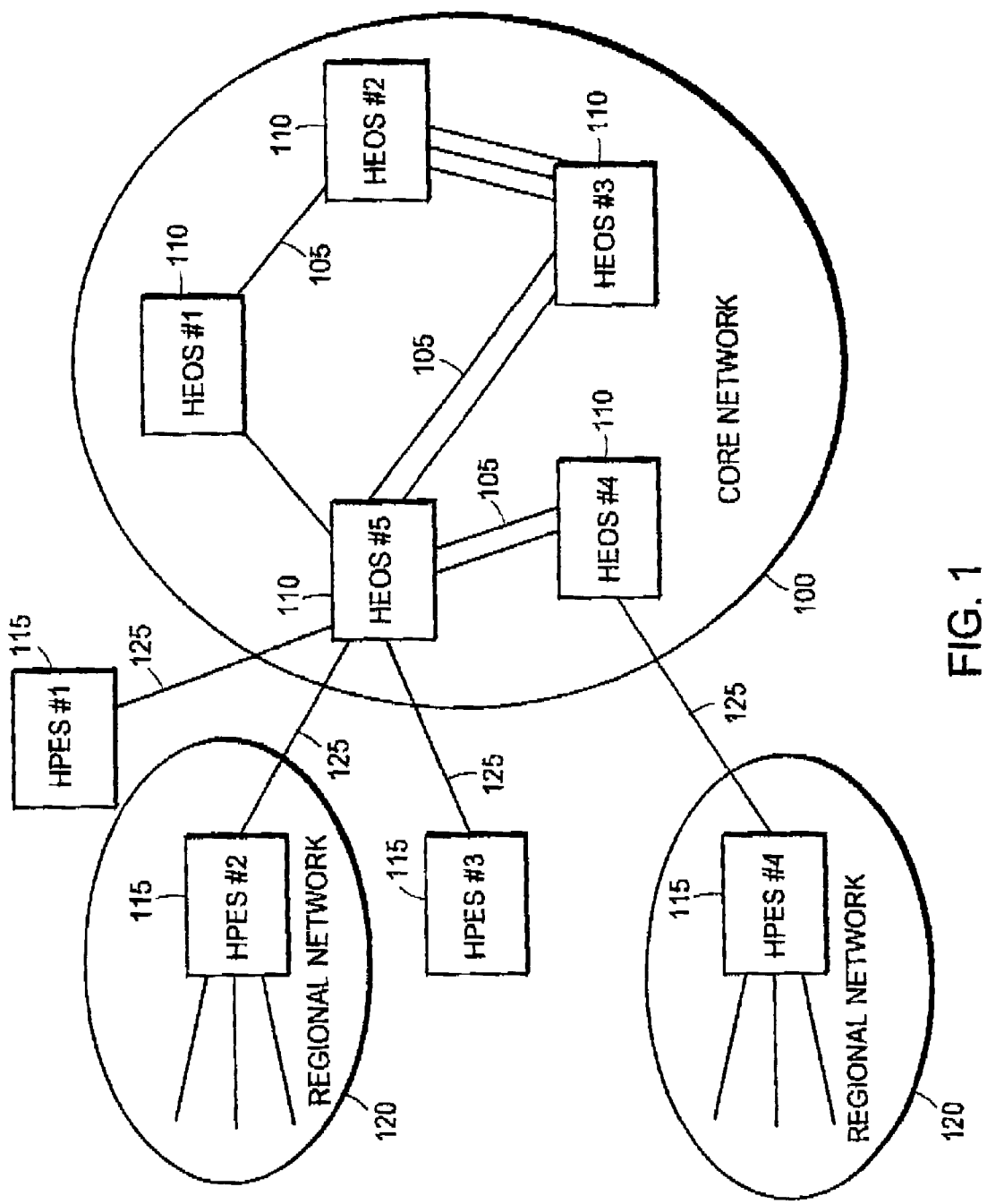
FIG. 1 shows the inventive components of a core network and inter-connectivity by optical fibers and electrical links.

FIG. 1 shows a core network 100 comprising hybrid electro-optic switches 110 (HEOSs) interconnected by optical fibers 105. On the periphery of the core network 100 are high performance electronic switches 115 (HPESs) that aggregate traffic from, for example, a particular geographic region or local area network 120. Some of the traffic within a regional network 120 is destined for other networks on the periphery of the core network 100, while other traffic within a regional or local network 120 is to remain within the particular geographic region. Communication link 125 supports the transfer of data between an HPES 115 and an HEOS 110 in the core network, while optical fibers 105, alternatively designed using at least some electrical links, provide support for the transfer of data among interconnected HEOSs 110 in the core network 120.

The preferred embodiment of the present invention involves routing information between regional networks, wherein a core network 100 of HEOS components collectively provide high speed routing of data traffic from one regional network 120 to another.

The topology of the core network 100 is flexible and modular to support future growth. For example, traffic from a regional network 120 flowing through the core network 100 may increase, requiring additional links between an HPES 115 and HEOS 110 in the core network 100.

Therefore, each HEOS 110 is optionally designed to support multiple HPESs 115.

Additionally, each HEOS 110 in the core network 100 is designed to support one or multiple fibers 105. Traffic through one particular optical router may warrant two or more optical fibers 105 between a pair of HEOSs 110. Therefore, a highly used traffic route between a pair of HEOSs optionally supports multiple fibers. Based on the core network topology, communication between two regional networks 120 is achieved by routing information through one or more HEOS 110 within the core network 100.

Figure 2A:
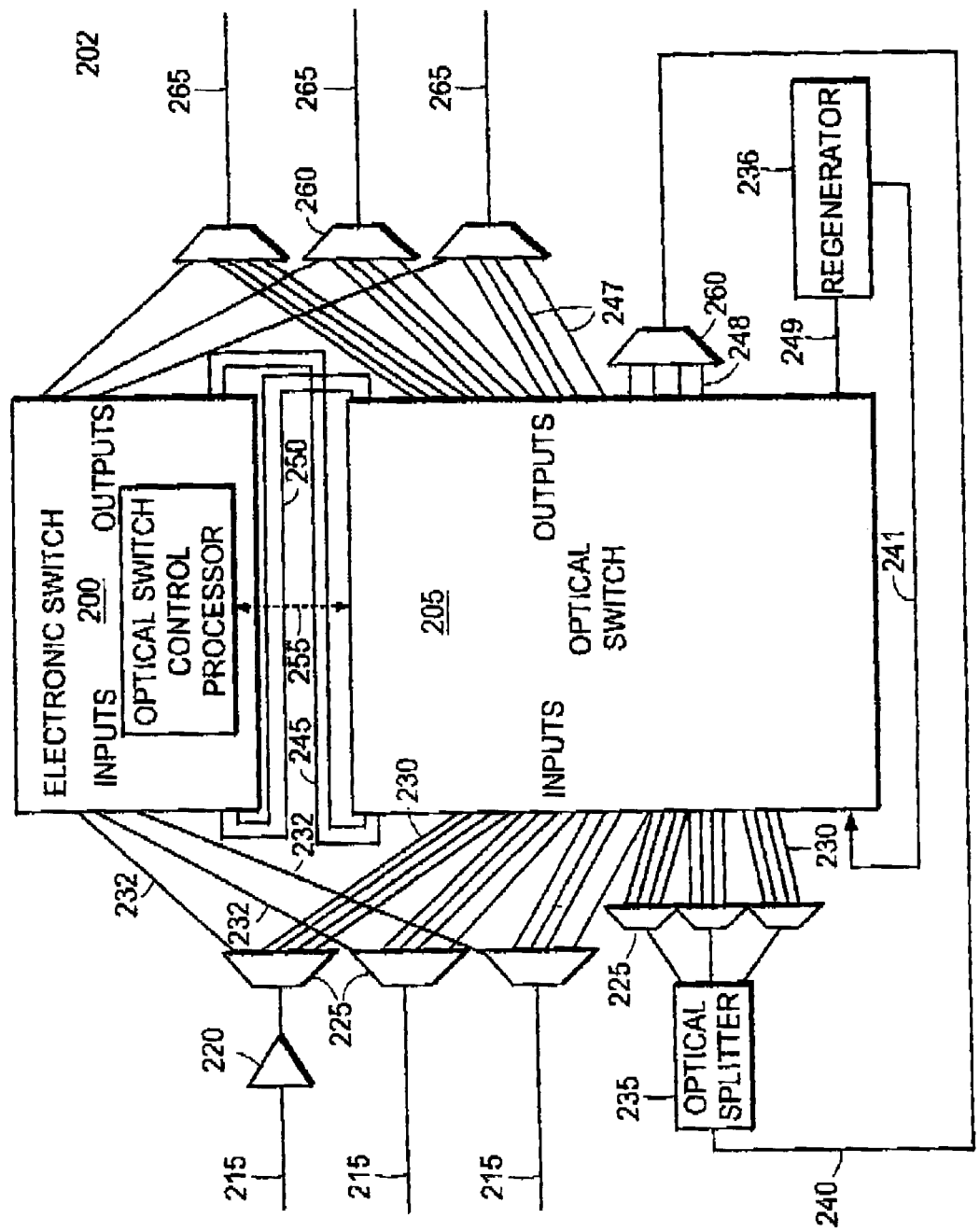
FIG. 2A illustrates the inventive hybrid electro-optical switch and associated circuitry.

FIG. 2A shows the components of a hybrid electro-optical switch 202. At the core is an electronic switch 200 capable of supporting, for example, the MPLS (Multi-Protocol Label Switching) flow labels and an optical switch 205 that is configured by the optical switch control processor 210 via control signals 255.

The core network 100 is optionally designed to support any or all of IP (internet Protocol), ATM and MPLS flow label traffic. When forwarding data using IP, each router receiving a data packet analyzes its header based on a routing algorithm. Based on this forwarding technique, processing of header information is duplicated, resulting in redundant processing of information at multiple routers.

In MPLS, a routing path is determined once as the packet enters the network and a label is assigned corresponding to a desired flow path. The flow label serves as an index in a table that is used to determine a next hop and corresponding new label. Based on the MPLS protocol, no further analysis of the header is necessary as the data packet is routed based on the flow label. Further details of this common protocol for routing optical data on a WDM network is available in "Multiprotocol Label Switching Architecture" (MPLS) by Rosen et al. and can be found at http:/wwwietf.org/ID.html, the entire teachings of which are herein incorporated by reference.

When the MPLS protocol is used, traffic aggregated at an HPES 115 from a regional network 120 on the periphery of the core network 100 is appended with appropriate flow labels for routing information on a dedicated wavelength through one or more hybrid switch circuits. Each hybrid switch circuit also supports data packet or message routing based on the aforementioned methodology using MPLS flow labels.

Like each HPES, communication data generated by HEOSs 110 in the core network 100 also involves appending a flow label to a data packet for routing of information from an HEOS to other HEOSs and HPESs. Based on such a scheme, optimal routing of data on a first dedicated wavelength between and among HPESs 115 and HEOSs 110 in the core network 100 is achieved using the MPLS protocol.

Each HPES 115 or neighboring HEOS 110, depending on connectivity, is capable of simultaneously transmitting a number of wavelengths such as $T_1 \ldots T_{12}$ into optical fiber inputs 215. The optical fiber inputs 215 are de-multiplexed using de-multiplexors 225 into individual wavelengths for routing of optical channels through particular fibers 230.

Optical switch 205 provides a platform for directing signals from inputs 230 to outputs 247 or 248 based on a particular wavelength. In the preferred embodiment, such signals are routed without converting an optical signal to an electrical signal, i.e., the optical signal itself is routed based on wavelength and signals from the control processor. This type of architecture is advantageous because there is no electronic processing or buffering of the original optical signals passing through the optical switch 205. It should be noted that the makeup of the optical switch 205 is not as important as its functional capabilities, which support high speed throughput and directivity of optical data signals.

In an alternate embodiment, the optical switch 205 includes analog and/or digital circuitry, wherein an input wavelength is converted and routed via an electronic signal before being optically transmitted towards a destination node. For example, optical switch 205 may take a form such as O-E/analog/E-O or O-E/digital switch/E-O, where "E" and "O" stand for electrical and optical respectively. The optical switch 205 is optionally a mix of both the preferred and alternate embodiment supporting both types of data transfers. Note that in this embodiment buffering is still not needed.

Electronic switch 200 and optical switch 205 are distinct in a number of ways. Electronic switch 200 electronically processes the received signals. For example, it monitors received data within the signals, such as header information, to determine appropriate routing of information. Optical switch 205, on the other hand, is a slave device that directs data from optical inputs 230 to optical outputs 247 through flow paths based upon settings issued by optical switch control processor 210 rather than upon destination information encoded within the signals themselves. Routing an optical signal based on information within a given data packet is less efficient because the entire contents of such a data packet or optical signal must be stored and, after determining the destination of the signal based on information within the signal, the original signal and its contents must be re-created and transmitted to the appropriate destination.

Based on the alternate embodiment, an optical signal on input 230 is fed into optical switch 205, wherein the received signal is converted from optical to electrical. The converted electrical signal, in the form of an analog or digital signal, is then directed to the appropriate output in the optical switch 205 according to optical switch control processor settings rather than routing information within a data header. The electrical signal is then used to generate an optical signal that is transmitted on the appropriate output 247 or 248. As illustrated and regardless of the embodiment, a core function of the optical switch is to direct a received signal on a given wavelength to an optical output 247 or 248.

Optical switch 205 may, for example, be of the type discussed in "Photonic Switching and Interconnects" by Mararakchi, the entire contents of which is herein incorporated by reference. Other aspects of a potential embodiment of the optical switch 205 can be found in "Optical Networks: A Practical Perspective" by Ramaswami and Sivarajan, the entire teachings of which is herein incorporated by reference.

Based on any of the above-mentioned architectures of an optical switch 205 in an HEOS 202, each wavelength is de-multiplexed 225, switched and multiplexed 260 such that a given wavelength or optical channel is routed to an output fiber 265 based on control signals 255. In this way, any wavelength from an input fiber 215 can be routed, via the optical switch 205, to any output fiber 265. Also, multiple wavelengths on input fibers 215 are optionally routed to separate output fibers 265, all at the same time. The orchestration of multiple HEOSs 202 in the core network 100 supports simultaneous data transfers between regional networks 120 on the periphery of the core network 100.

Optical amplifier 220 is optionally used on one or any of the fiber inputs 215 to provide signal amplification. Some optical signals must travel, for example, hundreds or thousands of miles through the core network 100 and, therefore, require a signal boost or signal regeneration. This is discussed in more detail later in the specification.

At least one dedicated wavelength such as $T_1$, common to the core network 100, is routed to the electronic switch 200 on fiber inputs 232 and supports routing lower volume traffic, i.e., less than full bandwidth optical channel, between regional networks 120. Additionally, the dedicated wavelength T1 supports the setup of data transfers between two or more regional networks. In other words, the entire network also uses the dedicated wavelength T1 as a channel upon which HEOSs and HPES,5 communicate with each other. As mentioned, such communication may be based on either IP, MPLS or ATM traffic flows. When an established optical path is setup, further communications over the dedicated wavelength provide signals for starting, stopping or relaying the status of a data transfer. The core network optionally uses multiple dedicated wavelengths for communication among components in the core network 100.

Figure 2B:
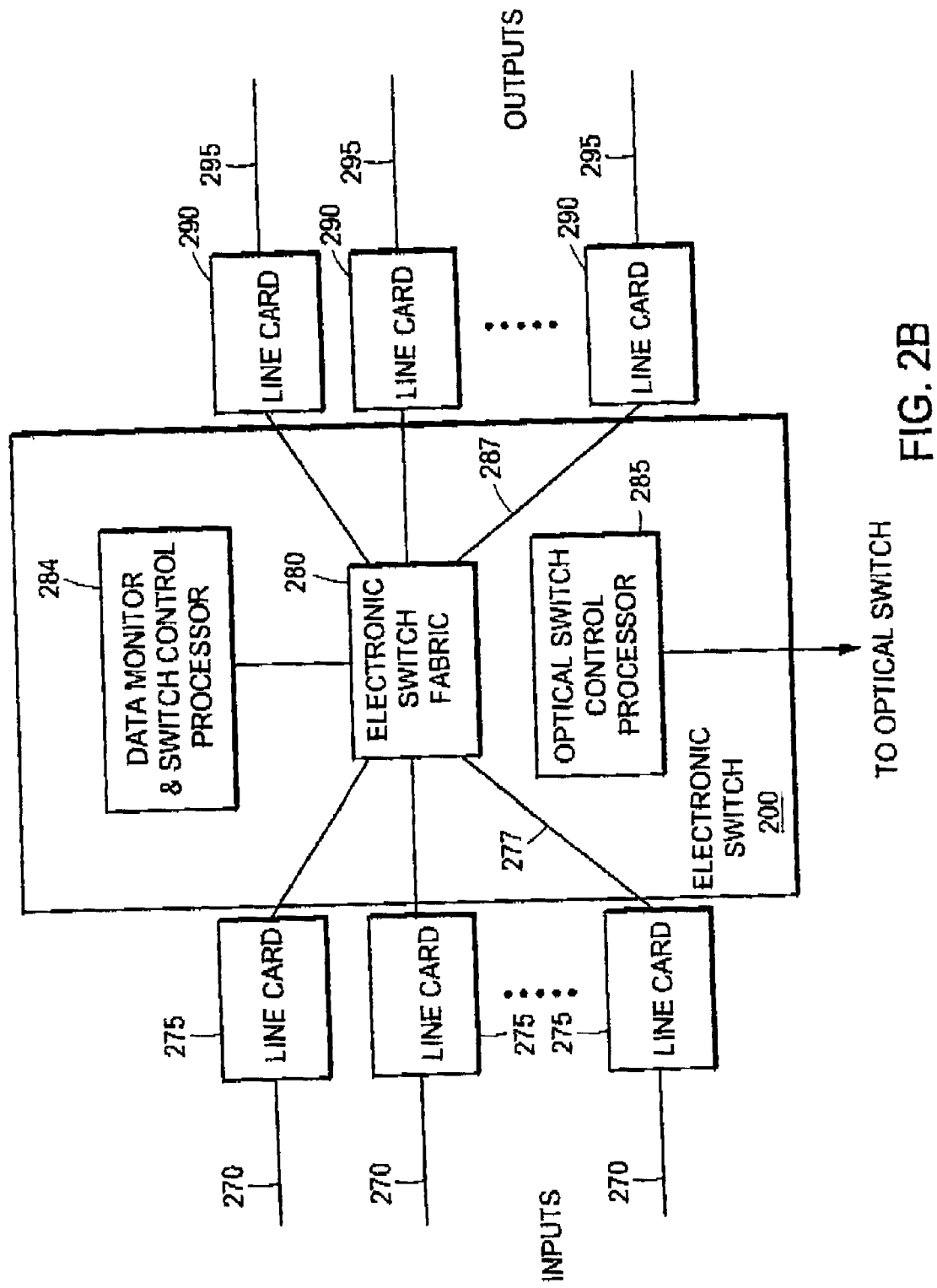
FIG. 2B shows further detail of the inventive hybrid electro-optical switch and related circuitry.

FIG. 2B shows more details and additional elements of the processing and control circuitry in electronic switch 200. Dedicated wavelength or wavelengths are input on lines 270 to line cards 275 which serve to convert the optical signal data at the dedicated wavelength to electrical signals. These signals are optionally routed via electronic switch fabric 280 to optical flow line cards 290 and eventually to an output fiber 295 according to setup commands from switch control processor 284. Forwarding of a data message is based upon the contents of the flow label header in each packet, or ATM cell header. Electronic switch fabric 280 may be a crossbar switch or any alternative structure supporting connectivity between an array of inputs and outputs. Based on this topology, an input packet or cell on a given wavelength is optionally routed to any output fiber 295. Further, an optical signal on input fiber 270 is optionally converted to a different wavelength transmitted on the output fibers 295.

Electronic switch 200 also includes a data monitor processor 284 for monitoring data transmitted on the first dedicated wavelength of multiple input fibers 270. In one embodiment, tags are connected to data packets being transmitted on the first dedicated wavelength to destination points such as peripheral regional networks 120. Typically, the tags are used to create virtual circuits or flows where data packets are routed from a source to a destination. Based on such a topology, the data monitor processor 284 detects when traffic from a source to a particular destination is substantial enough to warrant a direct flow path. When it appears that such a link is warranted, the data monitor processor 284 will communicate with other neighboring and relevant HEOSs in the core network to determine whether it is beneficial to establish a direct optical link for a given data stream. If so, a link is established and a wavelength is assigned to support such a data transfer. This is described in further detail below.

Optical switch control processor 285 also resides in electronic switch 200. This processor 285 communicates with the data monitor and switch control processor 284 and provides the setup information for optical switch 205. Based on settings in the optical switch 205, optical signals of various wavelengths are appropriately routed through an HEOS 110.

It should be noted that one or separate microprocessors may be employed to perform any of the required functions described herein. For example, optical switch control processor 285 and data monitor & switch control processor 284 may be implemented as a single processor.

Since each HPES 115 aggregates traffic, there will be times when huge blocks of data are sent from a node on one regional network 120 to a node on another regional network. If the dedicated wavelength $T_1$ can't handle the required throughput from a particular HPES 115, the HPES 115 alerts the core network 100 about an already existing or imminent bottleneck. Immediately, a distributed protocol is employed in the core network 100 over the dedicated wavelength to establish a flow path for transmitting the block of data. Information is relayed back to the HPES 115 making the transfer request about the relative time of transfer and wavelength or multiple wavelengths upon which the block of data will be routed. Meanwhile, communications among relevant HEOSs 110 in the core network result in the setup of an optical path between a requesting source and destination on the periphery of the core network 100.

Referring again to FIG. 2A, optical switch settings for routing wavelengths through the optical switch network 205 in a given HEOS 110, 202 are controlled by the associated optical switch control processor 210 and interconnecting bus 255. In the preferred embodiment, optical data transfers take place after all optical switches and multiplexors in the affected HEOSs are set up for the data transfer.

Internal to the core network 100, as mentioned, the flow of data will be routed based on the carrier wavelength of the signal and the state of the optical fabric. For example, a particular flow of data from HPES #1 will be routed via wavelength T2 on a certain fiber cable in the established flow path. Using this method, many combinations of transfers between a number of networks on the periphery can be performed simultaneously.

In the preferred embodiment, the intelligence for making routing decisions is distributed throughout the network in the HEOSs 110,202. However, a central router processing unit is alternatively employed to make all routing decisions for data transfers optically switched through the core network 100, each HEOS 115 responding to requested setup commands issued by the central router processing unit. A third option is to design an intelligent routing system somewhere between a distributed routing system and a central routing system.

FIG. 2A also shows several optical outputs 248 that are fed into multiplexor 260, the output of which is subsequently connected to optical splitter 235 via fiber 240. The output of the splitter 235 is de-multiplexed 225 and fed into the same HEOS 202 on fibers 230 for further optical routing in the optical switch 205. Each HEOS, therefore, has the capability of splitting and simultaneously routing an optical signal to multiple destinations without converting to intermediate electrical signals. As a result, a source on the periphery of the core network is capable of simultaneously transmitting the same information to a number of destination nodes based on optical signal splitting by an HEOS in the core network 100.

Outputs from the optical switch 205 into fiber 250 are optionally fed to inputs of the electronic switch 200. Conversely, outputs from the electronic switch 200 are optionally fed into fiber 245 directed to optical switch 205. This enables the processing unit 210 in the electronic switch 200 to support conversions of data traffic midstream through the HEOS 110, 202. For example, a signal flowing through the optical switch 205 is optionally directed to the electronic switch 200, rather than another HEOS 110 in the core network 100. The signal, therefore, can be converted from optical to electrical for signal processing by the electronic switch 200. This provides two useful capabilities: 1.) signal regeneration when long optical paths are utilized such as those that might be encountered during restoration, and 2.) wavelength conversion via electronic means if a single wavelength path is not available on an end to end basis. Some output line cards, therefore, in the electronic MPLS switch must provide tunable lasers capable of operating on more than the dedicated wavelength.

An optical signal regenerator 236 is optionally provided in an HEOS 202 to regenerate degraded optical signals. Typically, the degradations result from longer flow paths. Optical signals to be regenerated are directed through the optical switch 205 to output fiber 249 and into regenerator 236. The regenerator is operatively coupled (not shown) to the optical switch control processor which provides control information.

The regenerator 236 receiving the optical signal recreates the received signal to its original form including the original timing characteristics and transmits the re-created optical signal through link 241 back to optical switch 205. Based on this technique, the signal is further transmitted over the network on any desired wavelength. For instance, the regenerator 236 can retransmit the signal on the originally received wavelength or a newly chosen wavelength.

Figure 3:
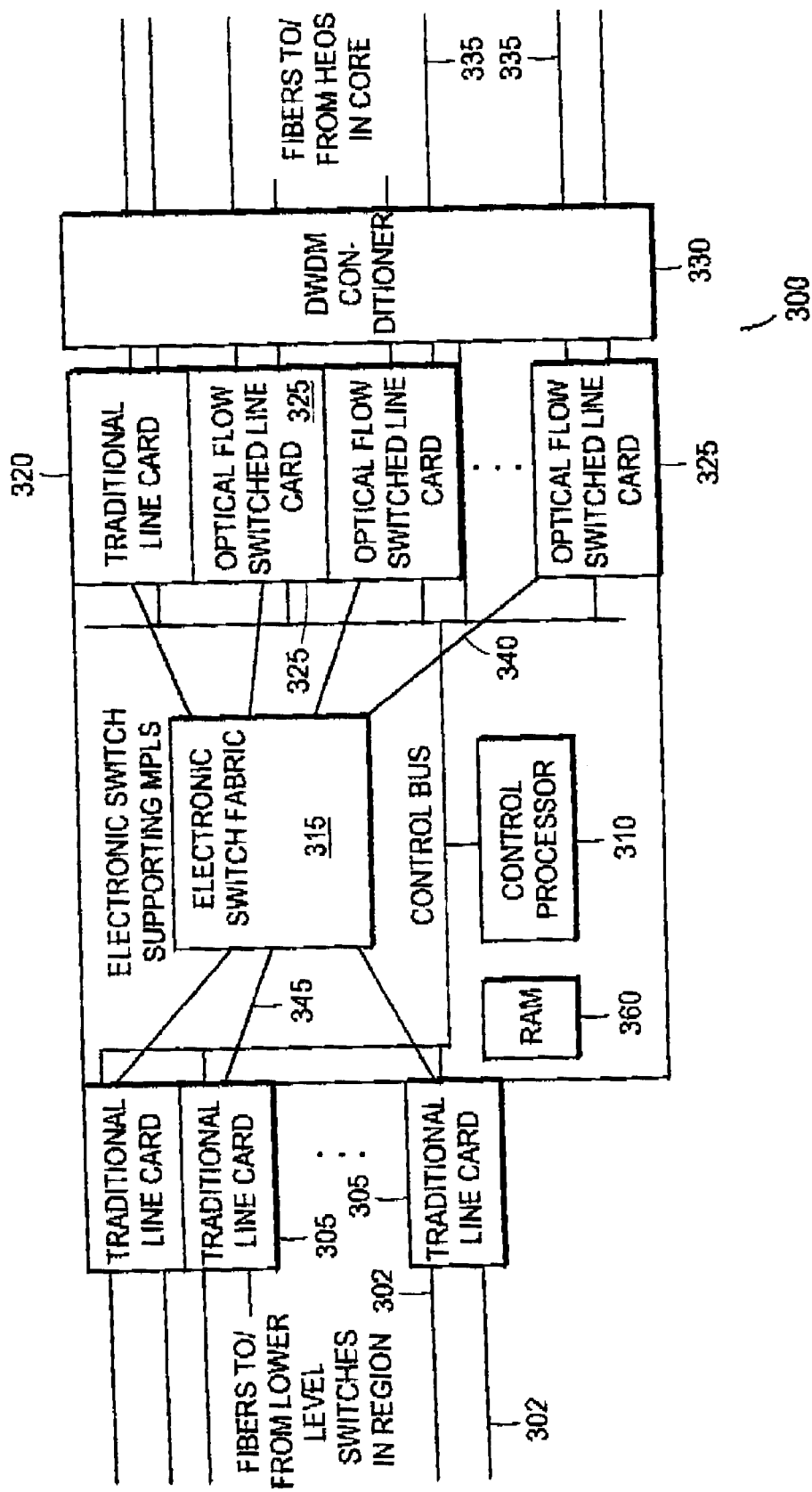
FIG. 3 shows the details of the inventive high performance electronic switch.

FIG. 3 shows the contents of a high performance electronic switch HPES 115 that resides on the periphery of the core network 100. Fundamentally, the device is an enhanced high performance switch capable of supporting the MPLS protocol.

The present invention includes at least two types of enhancements over standard high performance switches. First, bi-directional dense wavelength division multiplexing is supported by fibers between and among the HPES 300,115 and HEOS 202,110. Second, the HPES 300,115 is capble of re-mapping or re-directing MPLS based data flow from one output queue to another at the request of the associated HEOS 202, 110 in the core network that first receives the data from HPES 300,115.

An HPES 300,115 includes one or many traditional line cards 305 supporting fibers or links to/from lower level switches in a regional network 120. At the core of the HPES 300,115 is a control processor 310 for making MPLS flow decisions and an electronic switch fabric 315 for directing and controlling the flow of data between the regional network 120 and core network 100.

The HPES 300,115 also includes optical flow switched line cards 325 and, optionally, traditional line cards 320 between the electronic switch fabric 315 and DWDM conditioner 330 supporting fibers 335 between the HPES 300, 115 and HEOS 202,110 within the core network 100. The optical flow switched line cards 325 serves as a means of generating an optical signal at a desired wavelength, where the DWDM conditioner 330 then routes optical signals according to wavelength and commands from the control processor 310. When receiving data from the core network 100, the optical flow switched line cards 325 convert optical signals received from the HEOS 202,110 in the core network 100 to electronic signals, which are appropriately routed by the HPES 300,115 on the periphery of the core network 100 to a sub-node in the regional network 120 by the control processor 310 through traditional line cards 305.

Effectively, the DWDM conditioner 330 is used to rotue or demultiplex received signals to the appropriate optical flow line card 320 or optical flow switched line card 325. The electronic signals are routed through the electronic switch fabric 315 to the appropriate line card 305 and, eventually, the destination node in the regional network 120 using link 345 and traditional line cards 305 and fiber 302.

Figure 4:
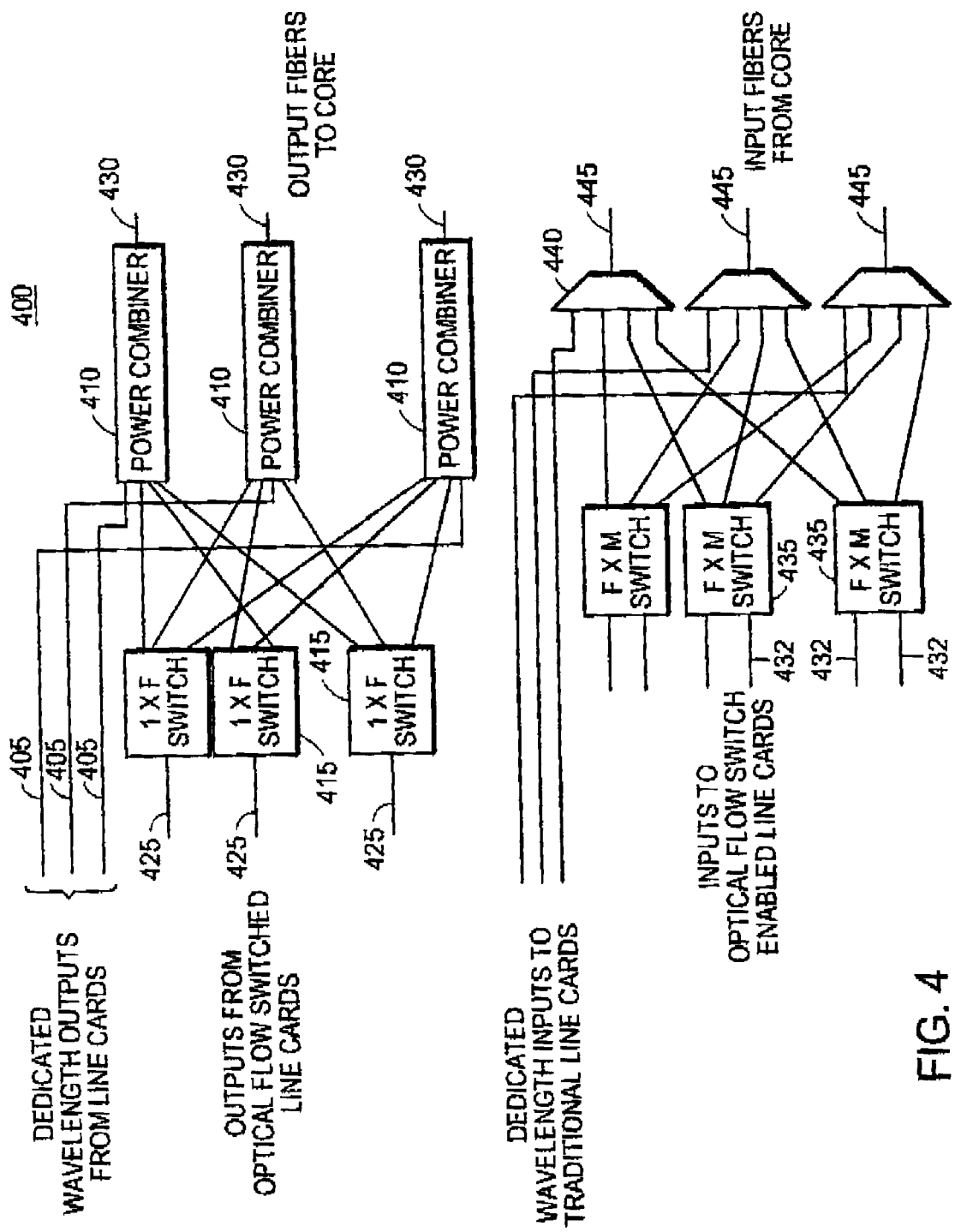
FIG. 4 shows the details of the inventive DWDM conditioner.

The preferred embodiment of the dense wavelength division multiplexor conditioner 400,330 is shown in FIG. 4. Dedicated wavelength outputs 405 from traditional line cards are fed into one of a plurality of power combiners 410. Outputs 425 from optical flow switched line cards 325 are fed into a 1xf switch 415 that switches the signal from the optical flow switched line cards 325 to one power combiner 410. Based on the inputs to the power combiner 410, an optical signal is transmitted through the output fibers 430 to inputs of the HEOS 202,110 in the core network 100.

Inputs 445 from the fiber core, on the other hand, are de-multiplexed 440 and fed into fxm switches 435 as shown in FIG. 4. These input signls 432 are then fed into The flow switch enabled line cards 325, while the dedicated wavelengths are fed into traditional line cards 320.

Figure 5:
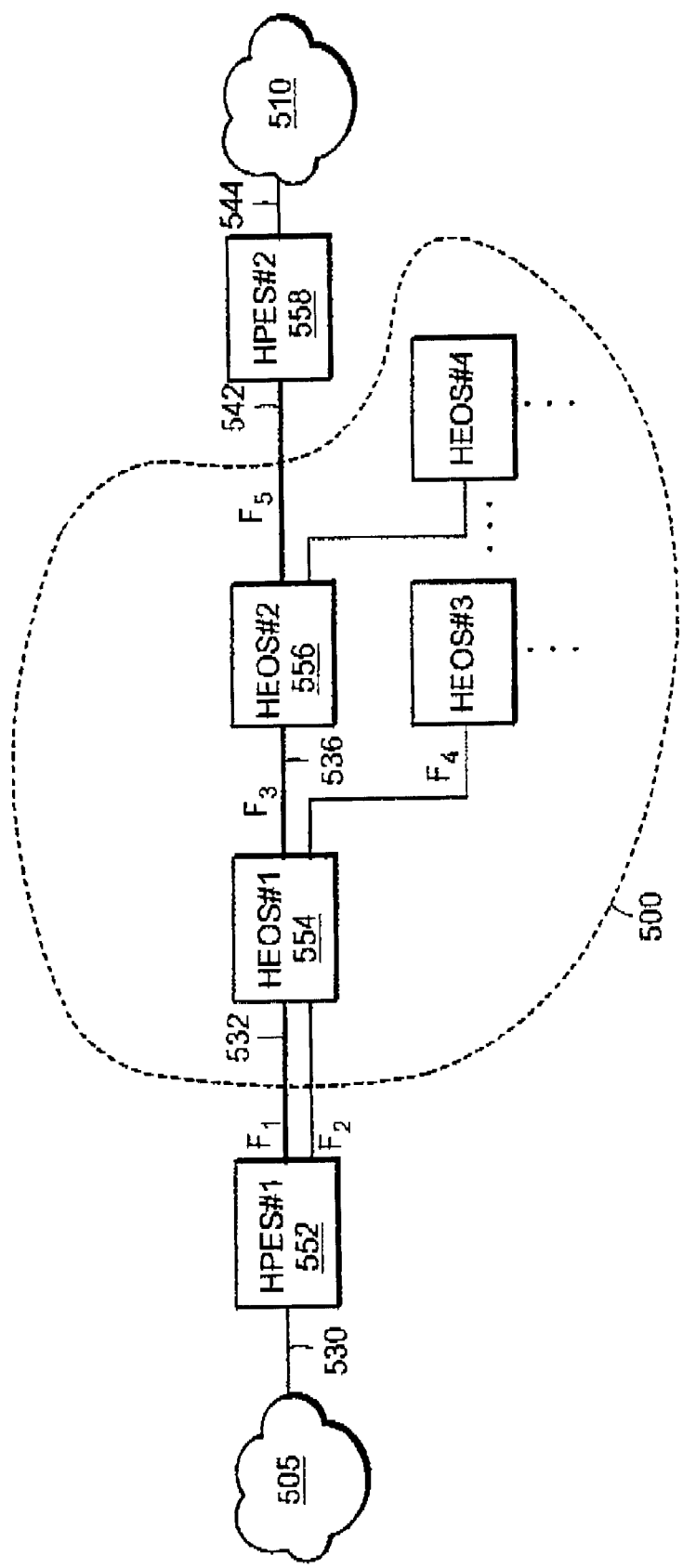
FIG. 5 illustrates an example flow path between regional networks according to the principles of the present invention.

FIG. 5 shows an example of an established flow path for transmitting data from a source HPES 552 to a destination HPES 558 on the periphery of core network 500. A first regional network 505 generating data traffic for a second regional network 510 connects to HPES #1 552 through link 530. An optimum optical path is chosen including optical fibers f1 532, f3 536 and f5 542 interconnecting elements HPES #1 552, HEOS #1 554, HEOS #2 556 and HPES #2 558 respectively. Based on the established flow path known to the participating interconnected elements, the source HPES 552 transmits optical data on fiber f1 532 to HEOS #1 554 via the chosen wavelength. An optical router in HEOS #1 554 then routes the optical signal to fiber f3 536 to HEOS #2 556. Completing the optical path, the optical signal is routed by the optical router in HEOS #2 through optical fiber f5 542 to HPES #2 558, where the retrieved data from the optical signal is then further routed to the appropriate sub-node at a destination in the regional network 510 via link 544. The aforementioned method and associated apparatus for transmitting data provides an advantageous way of directly routing optical traffic from a source to a destination node without intermediate conversions to and from electrical signals as is done using other traditional methods.

Figure 6:
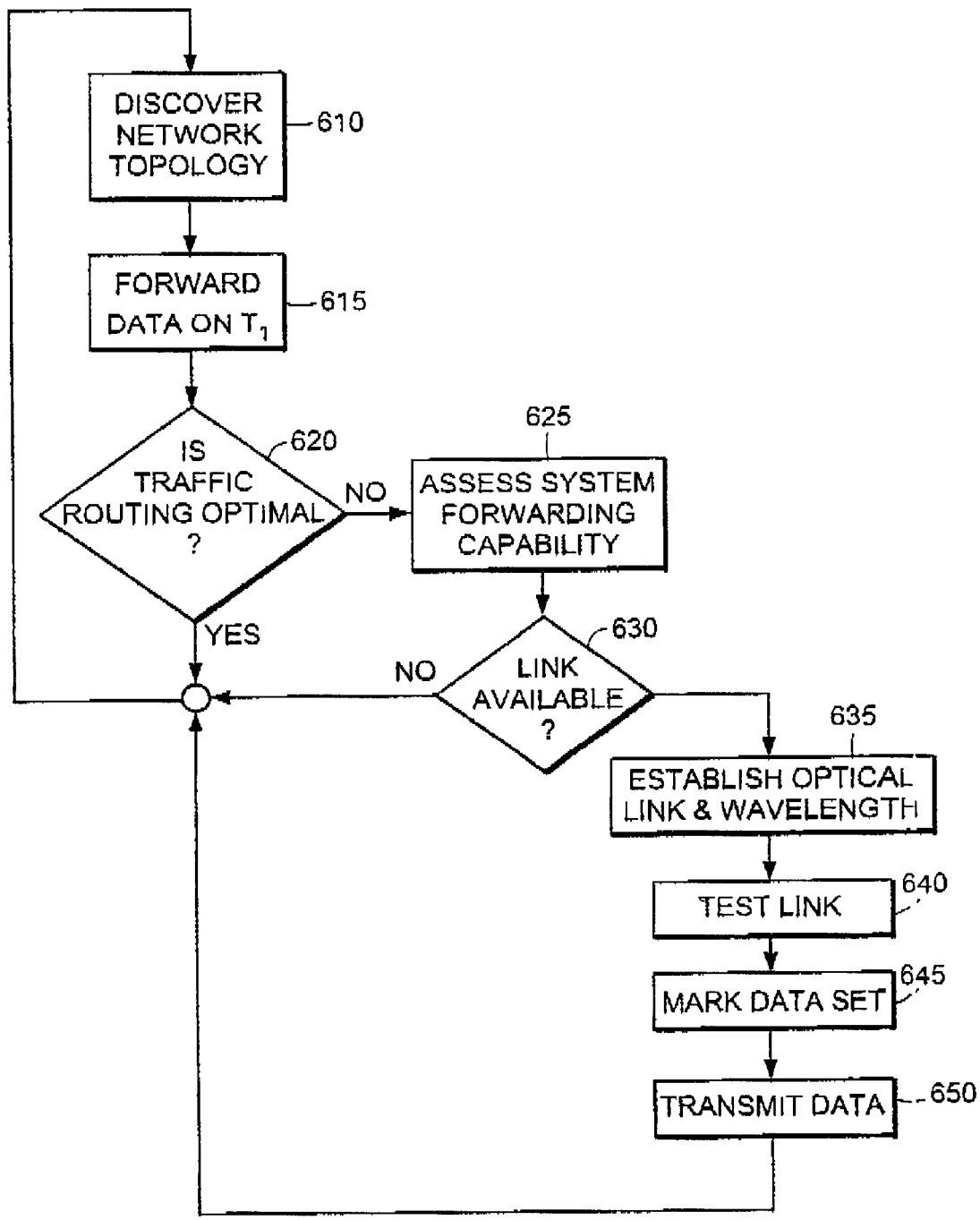
FIG. 6 is a flow chart of the inventive method of transmitting data between peripheral nodes on a network.

FIG. 6 shows a flow chart of the method used for establishing communication and the transmitting data according to the principles of the present invention. As various HPES 115 and HEOS 110 devices are powered up, they participate in a standard distributed protocol to automatically discover the topology of the core network 100 in step 610 including the fiber cable 105,125 connectivity of HEOS and HPES components. The transmitted information is used in conjunction with standard routing protocols for resource allocation and forwarding decisions.

As mentioned, the information regarding network topology and connectivity is exchanged on a dedicated wavelength $T_1$. Based on this method, only one channel is used for routing information. It should be noted that two or more wavelengths are assigned as dedicated wavelengths if a single dedicated wavelength is unable to handle the requirements of the core network. Further, an alternative communication link may be employed as long as at least a portion of the link is dedicated to support communication among the network of HEOSs 110.

All traffic between an HPES 115 and an HEOS 110 typically begins on the dedicated wavelength $T_1$, the content of which is optionally IP traffic or MPLS (labeled) traffic. At this point, the switching of lower volume data transmissions between nodes on the periphery of the core network through one or a series of HEOSs is done electronically in step 615. Traffic at the HPES is monitored so that it can be optionally routed using the resources within the core network 100. For example, the traffic on $T_1$ may become so heavy that a bottleneck occurs. If traffic is not being optimally routed through the core network 100 in step 620, i.e., a bottleneck occurs on the first dedicated wavelength, the core network's 100 forwarding capabilities are then assessed in step 625.

Each HEOS 110 in the downstream path determines if electronically switched traffic from an HPES 115 warrants a high speed flow path. When an optical path is warranted, a path is created by the coordinator of optical switch control processors in each of the HEOS devices. The HEOS notifies downstream HEOS and HPES devices of the specific fiber and wavelength upon which data will be transmitted. In addition, the HEOS will notify the HPES upstream that data flow will continue on an optical path rather than the electronic switch fabric of that HEOS. This frees up or prevents bottlenecks on the $T_1$ or electronic switch path.

Data transfers are constantly monitored in the system to assure optimal data transmissions among hybrid switch circuits and peripheral nodes on the core network 100. For example, statistical analysis performed by processors in the hybrid switch circuitry may indicate that a high speed link is required between two large cities at a particular time of day. In such a case, flow paths are optionally reserved for such traffic before a bottleneck occurs. In other words, it is not necessarily desirable to wait for a bottleneck on the first dedicated wavelength before a flow path is established for the transmission of data. The core network and supporting hybrid switch circuits in each HEOS 110 are designed to include processing power dedicated to optimally route data through the core network 100.

If a high speed flow is necessary and achievable based on available resources in step 630, a path is established and a particular wavelength is assigned to the data transfer in step 635. The resulting flow on the chosen wavelength carries a tremendous amount of data during a transfer because the data passes from one routing mechanism, i.e., each HEOS 110, without converting to electrical signals for processing of data to determine the next hop for a given data set. Following a data transfer, the resources free up for transfers between other nodes on the periphery of the core network 100. Based on this method, a given regional network 120 can reach any other node on the core network, wherein data in the core network 100 is transferred and routed based on a particular wavelength.

Prior to the transmission of data using a newly created flow path, devices at each end of the flow path must be set up and tested in step 640 to assure the proper transmission of data. For example, the receiving line card must: 1.) set its automatic gain control level, 2.) acquire and lock the serial clock, 3.) acquire symbol synchronization and 4.) set any other hardware modes for the receptor of data packets. Without appropriate set up, the first packet will not be properly received.

Safeguards must be put in place to assure that no packets are delivered out of order if a strict interpretation of the MPLS specification is followed. Therefore, the transmission of dependent data in the electronic switch path $T_1$ should finish prior to the transmission of data on a newly created light path. Otherwise, there is a risk that data on the optical path will beat the data transmitted on the electronic switch path to the destination mode. Conversely, data transmitted on a dedicated wavelength may arrive at a destination earlier than on an established optical flow path.

Assuring that no packets are delivered out of order is achieved in a number of ways. In the preferred embodiment, the relevant HEOS 110 reliably notifies destination HPES 115 of a flow that will arrive on a particular wavelength and that it should not forward any data from the optical flow until a marker is received on the electronic path indicating that the last electronically switched packet has been received. An HEOS next reliably informs the source HPES to begin sending the relevant flow optically (including which λ and fiber to use) and to send a marker on the (old) electronic path. Note that multiple markers from the source HPES must be sent in case one of the markers is lost due to an error in transmission.

A marker in step 645 is inserted on the output queue of electronic switch path before transmitting data in step 650.

In addition, a transmitting HPES 115 optionally estimates the time required for previously transmitted data to reach the destination and, after delaying this amount of time, transmits the data on the optical light path. Lastly, the transmitting HPES can simultaneously transfer data on both the optical and electronic switch path. However, data on the optical link must be stored in a queue until a marker, indicating the end of data, is received on the old electronic switch path.

A strict interpretation of MPLS need not always be followed. In other words, it is not always necessary to insure that data packets are not delivered out of order. For example, MPLS labeled IP traffic may be delivered out of order because IP itself does not guarantee in sequence delivery of data packets. Furthermore, the IP traffic is likely to be an aggregation of packets from multiple sources to multiple destinations where such interleaving would be of no consequence.

An HPES 115 transmitting over an optical light path will monitor the available transmit capacity and periodically report this to downstream HEOSs 110. This will provide each HEOS in the light path with the appropriate information allowing the HEOS to decide whether a new flow may be assigned to the existing light path. Such multiplexing of flows over a light path may be accomplished in a number of ways including: 1.) fixed bandwidth assignment where the fraction of bandwidth assigned to a flow does not change, 2.) demand bandwidth assignment and 3.) a mixture of fixed and demand bandwidth assignment. Fixed bandwidth assignment guarantees resources a flow receives while demand bandwidth assignment optimizes throughput on the light path. A mixture of fixed and demand bandwidth provides guaranteed transfer capacity for some flows while providing best-effort service to others on the same light path.

Data transfers on established optical paths are constantly monitored to determine when such data transmissions are optimally routed back through the electronic switch path through the HEOS 110. For example, traffic may dwindle on an established flow path resulting in a poor use of communication resources. An opening of such high speed data channels, therefore, allows resources to be used for other optical traffic.

Sensing the completion of a data transmission can occur in a number of places. First, an HPES 115 at the source or destination of established flow path can monitor aggregated traffic at a regional network 120 and send a message to elements in the core network 100 indicating the end of a particular data transmission. Second, an HEOS 110 in the core network 100 optionally monitors data traffic on a particular flow to determine the end of a data transmission.

Based on the design of each HEOS 110, one or more wavelengths can be routed to the optical switch outputs where they are redirected back on line 250 to the electronic switch inputs as shown in FIG. 2A. In this way, data is optionally transmitted over an optical light path through a number of HEOSs in the core network 100, where an optical path ends at an HEOS in the core network and data is thereafter transmitted to the destination over an electronic switch path, such as $T_1$, for the balance of the transmission to an HPES 115 on the periphery of the core network. The entire flow path also can be terminated, forcing the source HPES to transmit future data on the electronic switch path $T_1$.

An auto-configuration protocol conveys information from an HPES 115 at the periphery to an HEOS 110 within the core network 100. This information is used to create the flow path between a source and destination HPES. For example, when creating a flow path, the system ensures that 1.) the necessary optical carrier wavelength can be generated by the source HPES, 2.) intermediate HEOSs can demultiplex and switch a partcular wavelength, 3.) the destination HEOS is capable of de-multiplexing and receiving the chosen wavelength, 4.) there is a common modulation, framing and bit rate between the source and destination, and 5.) the source is capable of supplying adequate optical signal levels such that the signal is properly received at the destination after being switched and attenuated by the core network 100. If not, amplification and/or regeneration must be introduced into the flow path.

Auto-configuration messages are transmitted among HPESs and HEOSs over the dedicated wavelength $T_1$. The messages are sent whenever any linking HEOS becomes active such as at power up, when the previously reported information is no longer valid, and when a peer request is received. Generally, the information exchanged over the dedicated wavelength $T_1$ is relevant only to the fiber over which the dedicated wavelength is being transmitted. At some point, however, the configuration of a local HEOS ultimately effects that of a remote HEOS. In the preferred embodiment, the auto configuration protocol is used on each optical fiber even if there are multiple fibers between respective nodes.

At a minimum, the following information will be sent using the auto-configuration protocol: 1.) the set of wavelengths that can be generated, multiplexed, transmitted, de-multiplexed and received as a given pair, 2.) the maximum number of wavelengths that can be used on a given fiber, 3.) the bit rates, modulation methods and framing formats allowable by interconnected electronics, 4.) the transmitter and receiver dynamic ranges for acceptable bit error rate performance, and 5) whether the link has electronic regeneration and supported formats.

A flow connection protocol supports routing of data between nodes. Specifically, the protocol serves a number of purposes. First, the protocol conveys information causing an HPES 115 to re-map a data flow from electronic switch path to a specified wavelength on a designated fiber. Second, the flow connection protocol is used to convey that a receiving HPES will receive data on the designated fiber over the particular wavelength. Third, the flow protocol allows an HPES to explicitly request that an existing data flow be converted to a high speed optical path, the downstream HEOS 110 responding to whether there are resources available to satisfy the request. Finally, the flow connection protocol is used to allow an HPES to notify pertinent HEOSs when a flow is no longer active or that the characteristics of the data flow have changed.

Re-mapping a flow connection requires the exchange of several message types. A first message is conveyed including the re-mapping information. A second message conveys the precise time when the re-mapping information is to be effective, assuring that no forwarded data packets are received out of sequence. Typically, a re-mapping message will include information such as: 1.) the current flow label and the new flow label, 2.) the new fiber and wavelength for the flow, and 3.) the modulation, framing, bit rate, optical power level, and type of bandwidth assignment (fixed or demand) to use when transmitting the new flow.

A re-mapping message is typically sent to the destination HPES before it is sent to the source HPES. This is done so that the source HPES does not send data to the destination HPES until it is set up to receive the information. Once re-mapping is received by the destination node, the source HPES is then free to forward traffic on the old as well as the new flow path. Because the new flow may follow a light path with a shorter or longer propagation delay time, the reception of a re-mapping message by the source HPES also causes it to send a message including a marker, indicating the tail end of information on the old flow path. Once received, the queued information from the new flow path can be processed. Duplicate marker messages are sent on each path to ensure that a bit error in one path does not significantly interrupt the continuous transmission of the flow data to the ultimate destination.

When a high speed optical link is to be established for transmitting data, the core network 100 must verify that resources exist to accommodate the flow. Hence, appropriate resources must be reserved. One such reservation scheme is discussed in "Efficient Distributed Control Protocols for WDM All-Optical Networks" by Yousong Mei and Chunming Qiao at SUNY Buffalo, Department of ECE, the entire teachings of which are herein incorporated by reference. While some data transfers could benefit from a protocol supporting short setup delays, optimization of data transfer through the core network 100 does not necessarily suffer since data typically is, transmitted while the optical path is being set up.

Data transfer failures occur in any networking system. Such failures include node failures, partial node failures or link failures. To recover from a failure, the failure must first be detected and existing data flows should be re-routed avoiding the failed element.

Typically, networking systems employ error detection and recovery at many layers. Some failure detection systems operate on the order of seconds, or even tens of seconds, while others such as SONET operate on the order of tens of milliseconds. When two such failure detection methods are used together, it is important that the time frame of operation does not overlap to avoid multiple recovery mechanisms from being invoked simultaneously. In the preferred embodiment of the present invention, failure detection and recovery is designed to operate on the order of tens of milliseconds whenever possible.

A failure must be detected quickly and efficiently to assure a recovery on the order of milliseconds or faster. In particular, if a media failure occurs on the dedicated wavelength of a given fiber, it is likely that all of the wavelengths in that fiber will fail simultaneously.

The preferred embodiment of the present invention ensures rapid failure detection by monitoring the data received on the dedicated wavelength. During high utilization, received data packets are monitored for errors. During low utilization of the dedicated wavelength, test packets are inserted and transmitted on the dedicated wavelength to verify that a particular fiber optic path and corresponding switches are operating properly. For example, each receiving unit optionally includes a timer that times out when a test packet or other packet is not received within a predetermined period of time, thus, indicating a failure in a cable or associated switch. Test packets are optionally time stamped to determine whether a given test packet is erroneously delayed.

It is possible that the optical bypass mode of an HEOS 110 function properly while the electronic flow on the dedicated wavelength fails. Therefore, each HPES 115 is designed to monitor received data packets on each light path channel to detect communication failures. Based on the data error or pattern of observed failures in the core, the likely cause of the communication failure is determined. For example, if the data packets for each channel on a given fiber fail, it is likely that the fiber optic cable is the source of the failure. The same type of failure is detected if an absence of a continuous stream of packets on every active wavelength. If a subset of wavelengths is observed to fail, the point of failure is determined based upon the knowledge of flow paths of upstream and adjacent HEOSs in the core network 100.

A recovery process is invoked when a failure on a downstream node on an HPES 115 or HEOS 110 has been detected. This involves pre-computing or real-time computing a backup path for each failed flow path. The former process involves computing a backup flow path before a failure occurs while the latter involves computing a backup after a failure has occurred. When a failure is detected, data between a source and destination on the periphery of the core network 100 are transmitted on the backup path. Future routing or mapping decisions are then based upon detected failures. For instance, if it is known that a particular fiber optic cable 105 between two HEOSs in the core network is a point of failure, present and future routing decisions will pursue an alternate communication path. In addition to notifying routing decision-makers when a particular node or path is defective, the protocol must also provide notification when a defective node has been repaired.

A flow monitor in each HEOS 110 maintains information about the state of the corresponding optical flows passing through it. Flow-specific information includes: wavelength used, flow label and next-hop flow label, flow bandwidth, flow type, multiplexing method and flow path as well as any pre-computed backup optical paths. This information is used to determine the feasibility of adding other flows to an existing light path and aid in resource recovery where a flow ends or when a failure occurs. Neighboring nodes notify each other of the flow information by communicating over the dedicated wavelength channel.

Certain types of optical flows may continue even though there is a node failure. For example, the failure of the electronic portion of the HEOS 110 may not have any effect on the state of the optical portion of the HEOS. The optical flow, therefore, can continue unimpeded. When the electronic part of the switch is revived, the flow monitor will read the state of the local optical switch configuration to learn the flow-specific information for each communication path. Based on this information, normal operation of the system can continue without disrupting prior optical flows.

It is rare that all wavelength channels on a particular fiber are used simultaneously. To ensure that optical path and associated electronics function properly, diagnostics are employed to detect failures and degradations as soon as possible. Typically, a protocol is employed to conduct tests between an HEOS 110 and neighboring HEOS 110 or HPES 115. In some cases, an Ientire flow path is tested between source and destination HPES on the periphery of the core network 100.

Such diagnostics include electronic loopback and one-way path tests. These tests are used to verify channel attenuation and predict link margin by reducing transmit power until the BER exceeds a specified level.

Network management computers are notified of component or link failures, or when the system is operating inefficiently. Typically, these messages are known as alerts or traps and are implemented using an appropriate protocol such as SNMP.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A hybrid switch circuit comprising:
   an optical switch including fiber inputs and fiber outputs for routing optical data signals from an input fiber to an output fiber;
   an electronic switch including an electronic controller for converting and monitoring traffic on at least a first dedicated wavelength used for communications and data transmissions among multiple hybrid switch circuits, wherein the electronic controller communicates with upstream and downstream circuits to establish a flow path for routing wavelengths on input fibers to output fibers in the optical switch; and
   at least one feedback circuit for feeding an optical output of the optical switch to an optical input.

2. A hybrid switch circuit as in claim 1 wherein the upstream and downstream circuits include other switch circuits.

3. A hybrid switch circuit as in claim 1 wherein the upstream and downstream circuits include other hybrid switch circuits.

4. A hybrid switch circuit as in claim 1 wherein the electronic controller converts optical data signals at the first dedicated wavelength to electronic signals and re-transmits at least part of the received optical data signals on the first dedicated wavelength to other hybrid switch circuits.

5. A hybrid switch circuit as in claim 4 wherein the electronic controller additionally creates and transmits messages to other hybrid switch circuits and peripheral nodes in a core network over the first dedicated wavelength.

6. A hybrid switch circuit as in claim 1 wherein at least some of the data transmitted among hybrid switch circuits includes tags indicating virtual circuits and the hybrid switch circuits monitor traffic on individual virtual circuits to initiate flow paths.

7. A hybrid switch circuit as in claim 1 wherein the electronic controller monitors traffic on a plurality of dedicated wavelengths to establish flow paths for optical routing of signals.

8. A hybrid switch circuit as in claim 1 wherein communication among hybrid switch circuits is based on an MPLS protocol.

9. A hybrid switch circuit as in claim 1 further comprising an electrical link supporting communication among interconnected hybrid switch circuits.

10. A hybrid switch circuit as in claim 1 wherein the electronic controller includes at least one high speed microprocessor.

11. A hybrid switch circuit as in claim 1 wherein the optical switch in a hybrid switch circuit includes a network of optical multiplexors and de-multiplexors controlled by electrical signals for routing an optical signal at a given wavelength.

12. A hybrid switch circuit as in claim 1 wherein a hybrid switch circuit includes a splitter for enabling a simultaneous flow of an optical data signal to more than one output fiber.

13. A hybrid switch as in claim 12 wherein selected output signals from the optical switch are fed into an optical splitter, outputs of which are further routed through the optical switch enabling a simultaneous flow of an optical data signal to more than one destination.

14. A hybrid switch circuit as in claim 1 wherein the hybrid switch circuits support bi-directional data flow on optical fibers interconnecting the hybrid switch circuits.

15. A hybrid switch circuit as in claim 1 wherein a flow path is established depending on a level of multi-protocol label switching traffic through the hybrid switch circuit.

16. A hybrid switch circuit as in claim 1 further comprising:
a regenerator for regenerating the optical data signals, the regenerator disposed in a feedback path between an output and input fiber of the hybrid switch circuit.

17. A hybrid switch circuit as in claim 1 further comprising:
a wavelength converter for converting a selected optical data signal to a different wavelength, wherein the wavelength converter is disposed in a feedback path between an output and input fiber of the hybrid switch circuit.

18. A hybrid switch circuit as in claim 1 further comprising:
at least one feedback path from an output fiber of the optical switch to an input of the electronic switch.

19. A hybrid switch circuit as in claim 1 wherein the optical switch is occasionally tested to assure reliability of routing optical data signals from an input fiber to an output fiber.

20. A hybrid switch circuit as in claim 1 wherein at least one flow path is reserved for future use based on historical usage.

21. A hybrid switch circuit as in claim 1 wherein selected flow paths are reserved based on expected usage.

22. A method of supporting communication with a hybrid switch circuit comprising the steps of:
converting and monitoring traffic on a first dedicated wavelength with an electronic controller in the hybrid switch circuit where data is routed through an electronic switch, the first dedicated wavelength supporting data transmissions among multiple hybrid switch circuits;
conmmunicating with upstream and downstream circuits to establish a flow path for routing wavelengths on input fibers to output fibers in an optical switch of the hybrid switch circuit;
routing optical data signals through the optical switch from an input fiber to an output fiber; and
feeding at least one optical output of the optical switch to an optical input.

23. A method as in claim 22 wherein the upstream and downstream circuits include other switch circuits.

24. A method as in claim 22 wherein the upstream and downstream circuits include other hybrid switch circuits.

25. A method as in claim 22 wherein the electronic controller converts optical data signals at the first dedicated wavelength to electronic signals and re-transmits at least part of the received optical data signals on the first dedicated wavelength to other hybrid switch circuits.

26. A method as in claim 25 wherein the electronic controller in a hybrid switch circuit additionally creates and transmits messages to other hybrid switch circuits and peripheral nodes in a core network over the first dedicated wavelength.

27. A method as in claim 22 wherein at least some of the data transmitted among hybrid switch circuits includes tags indicating virtual circuits and the hybrid switch circuits monitor traffic on individual virtual circuits to initiate flow paths.

28. A method as in claim 22 wherein the electronic controller monitors traffic on a plurality of dedicated wavelengths to establish flow paths for optical routing of signals.

29. A method as in claim 22 wherein communication among hybrid switch circuits includes an MPLS protocol.

30. A method as in claim 22 further comprising an electrical link supporting communication among interconnected hybrid switch circuits.

31. A method as in claim 22 wherein the electronic controller includes at least one high speed microprocessor.

32. A method as in claim 22 wherein the optical switch in a hybrid switch circuit includes a network of optical multiplexors and de-multiplexors controlled by electrical signals for routing an optical signal at a given wavelength.

33. A method as in claim 22 wherein a hybrid switch circuit includes a splitter for enabling a simultaneous flow of an optical data signal to more than one output fiber.

34. A method as in claim 33 wherein selected output signals from the optical switch are fed into an optical splitter, outputs of which are further routed through the optical switch enabling a simultaneous flow of an optical data signal to more than one destination.

35. A method as in claim 22 wherein the hybrid switch circuits support bi-directional data flow on optical fibers interconnecting the hybrid switch circuits.

36. A method of communicating with a hybrid switch circuit as in claim 22 further comprising the step of:
establishing a flow path depending on a level of Multi-Protocol Label Switching traffic through the hybrid switch circuit.

37. A method of communicating with a hybrid switch circuit as in claim 22 further comprising the step of:
regenerating the optical data signals in a feedback path between an output and input fiber of the hybrid switch circuit.

38. A method of communicating with a hybrid switch circuit as in claim 22 further comprising the step of:
converting an optical data signal to a different wavelength.

39. A method of communicating with a hybrid switch circuit as in claim 22 further comprising the step of:
feeding back a signal from an output fiber of the optical switch to an input of the electronic controller of the hybrid switch.

40. A method of communicating with a hybrid switch circuit as in claim 22 further comprising the step of:
occasionally testing a flow path by routing an optical data signal from a selected input fiber to an output fiber.

41. A method of communicating with a hybrid switch circuit as in claim 22 further comprising the step of:
reserving at least one flow path for future use based on historical usage.

42. A method of communicating with a hybrid switch circuit as in claim 22 further comprising the step of:
reserving a selected flow path based on expected usage.

* * * * *